Oct. 18, 1966  K. H. ZENTMAIER ETAL  3,279,420
MULTI-RANGE DIGITAL INDICATOR

Filed Jan. 24, 1964  2 Sheets-Sheet 1

INVENTORS
KARL H. ZENTMAIER
THOMAS E. JOHNSON
BY
Browne, Schuyler and Beveridge
ATTORNEYS INVENTORS
KARL H. ZENTMAIER
THOMAS E. JOHNSON
BY
Browne, Schuyler and Beveridge
ATTORNEYS.

United States Patent Office 3,279,420
Patented Oct. 18, 1966

3,279,420
MULTI-RANGE DIGITAL INDICATOR
Karl H. Zentmaier, Cranford, and Thomas E. Johnson, Boonton, N.J., assignors to Aircraft Radio Corporation, Boonton, N.J., a corporation of New Jersey
Filed Jan. 24, 1964, Ser. No. 339,973
2 Claims. (Cl. 116—124.1)

This invention relates to indicators, and more particularly to multi-range indicators for digitally displaying readings of different orders or ranges.

The invention has particular application in aircraft communication equipment for indicating the frequency on multi-band radio receivers. In such radio receivers, it is conventional to indicate frequency on a logarithmic scale with the scale for all frequency bands on a single, fixed panel, and a single pointer for all bands operated by a tuning dial or shaft. In some apparatus, a shiftable window or light is moved along the panel to a particular band scale when the operator desires to shift from one frequency band to another. With the latter type of apparatus, however, it is necessary for the operator to both visually select the proper band scale from several simultaneously visible scales, and then interpolate along the selected logarithmic scale. Moreover, an undesirable amount of space is occupied by such indicating devices, particularly in aircraft where space is at a premium.

An object of this invention is to provide a digital indicator for apparatus having a single operating or control shaft which can be selectively connected to operate one of a plurality of components, where the indicated readings for the different components encompasses different orders or ranges for each setting of the control shaft.

Another object is to provide a multi-range indicator that will display only one of a plurality of sets of numbers at any one time.

Another object is to provide an indicating assembly consisting of a plurality of digital indicators responsive to a single input shaft for presenting digital readings of different orders or ranges.

A further object is to provide a multi-band frequency indicator by means of which a frequency indicator for a single, selected band only is visible at any one time, and one which occupies a minimum amount of space.

A further object is to provide a direct visual readout frequency indicator for digitally presenting the frequency within a selected frequency band.

Still another object is to provide a multi-band frequency indicator having a separate digital indicator for each band, any one of which can be selectively positioned to be read at a reading line or viewing slot, the frequency indicators for the remaining bands automatically moving to a position hidden from view.

In achievement of the foregoing, and other objects, a rotatable carrier or drum is mounted in the casing of a receiver. Carried by the drum is a plurality of digital indicators of the decade counter type. The front panel of the casing is formed with a viewing slot or window, and by rotating the drum relative to the front panel, any desired one of the indicators may be shifted into a position to be read through the viewing slot, with the remaining indicators removed to an inactive position hidden from view. Each of the indicators is interconnected with a single input shaft, which, upon rotation, simultaneously actuates all of the indicators.

To correlate the indicators with the frequency of the receiver, the input shaft of the indicators is geared to the tuning shaft of the receiver so that upon rotation of the tuning shaft to change the frequency, a digital indication or reading of the frequency will be displayed at the viewing slot by the indicator selected to be read. Selection of the particular band is determined by a band or range selector shaft which is geared to the drum. By rotating the band selector shaft, the indicator for the selected band will be shifted into position to be displayed at the viewing slot or window and present a reading of the frequency within the selected band in accordance with the angular position of the tuning shaft. Since the indicators are simultaneously actuated by the tuning shaft, the correct frequency will automatically be displayed when the receiver is shifted from one band to another.

Other objects and advantages will become apparent from the following description taken in connection with the accompanying drawings in which.

Figure 3:
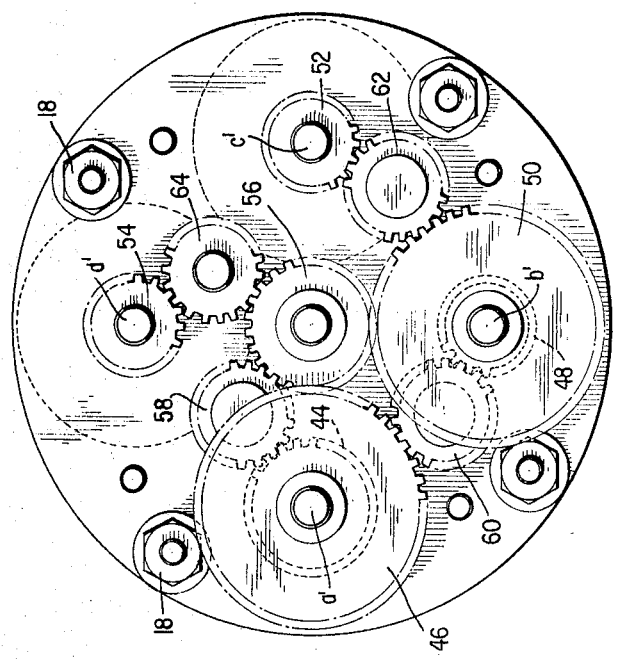
FIG. 3 is an end view taken from the hight-hand end of FIG. 2.

With reference to the drawings, an indicator assembly A includes four digital indicators $a$, $b$, $c$, $d$, in the form of conventional decade counters, each indicator having an operating shaft $a'$, $b'$, $c'$, $d'$, respectively. Indicators $a$, $b$, $c$, $d$ are mounted on a drum or carrrier, designated generally by reference numeral 10, which is made up of a pair of circular plates 12 and 14, mounted at the ends of a plurality of rods 16. Plates 12, 14 and rods 16 are secured together in a conventional manner such as by bolts 18.

Figure 2:
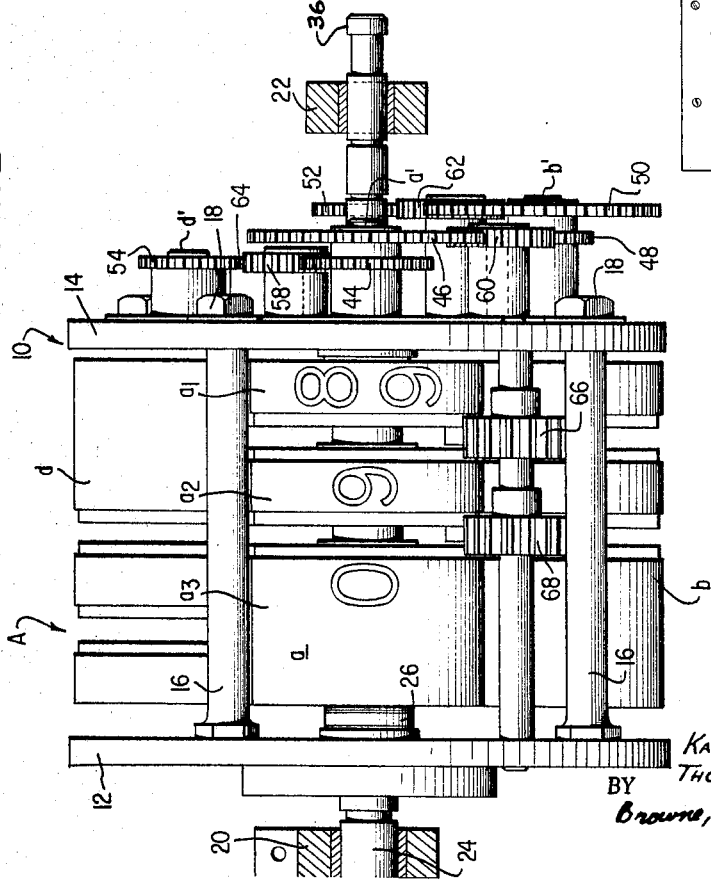
FIG. 2 is a front view of the indicator assembly removed from the casing.
Figure 1:
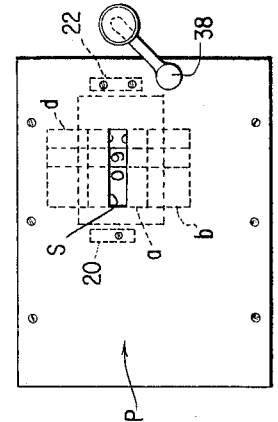
FIG. 1 is a front view of a radio receiver casing having a frequency indicator embodying the invention.

Mounted on plate 12 of drum 10 is a shaft 24 which is secured against rotation relative to plate 12 in a conventional manner such as by a threaded cap 26 (FIG. 2). Shaft 24 is rotatably journalled in a bearing or support member 20. By rotating shaft 24 in member 20, any one of the digital indicators $a$, $b$, $c$, or $d$, can be positioned at a stationary reading line. In the illustrated embodiment (FIG. 1) the reading line is defined by a viewing slot or window S formed in the front panel P of the casing of a radio receiver, and member 20 is secured to the inner wall of panel P in a position such that the axis of rotation of drum 10 is in horizontal alignment with slot S. In FIG. 1, the drum is positioned to display indicator $a$ at slot S, and it is apparent that by rotating shaft 24, indicator $b$, $c$, or $d$ may also be shifted into the position adjacent slot S, only one of the indicators being visible when drum 10 is in one of the four positions.

Figure 4:
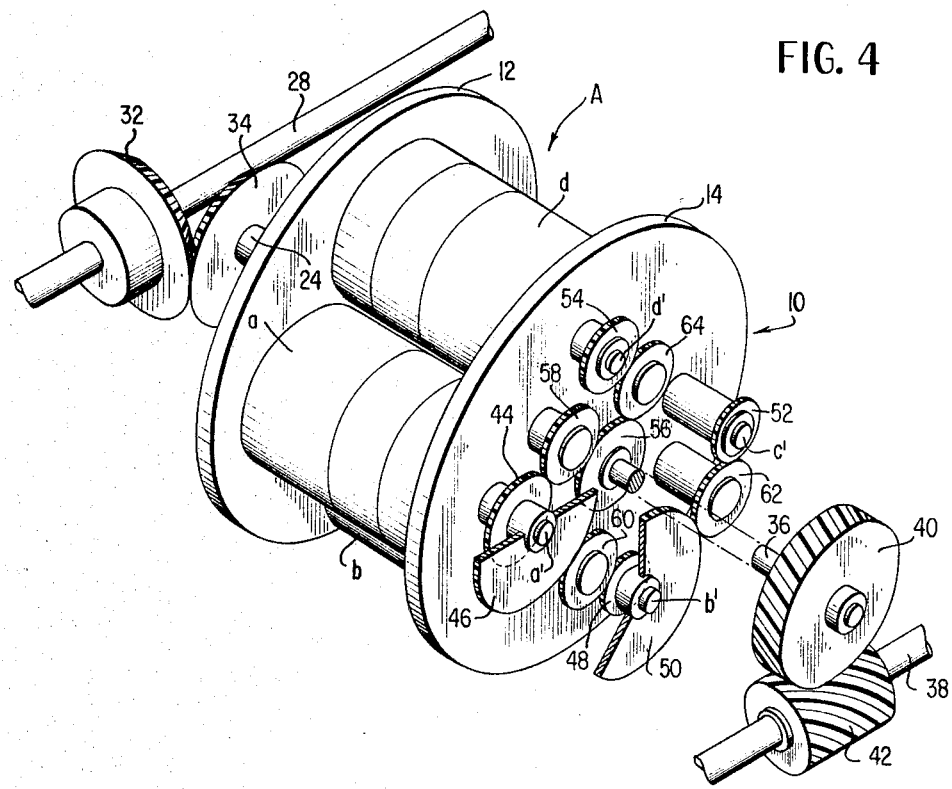
FIG. 4 is a perspective view of the indicator assembly with certain parts removed for clarity of illustration.
Figure 5:
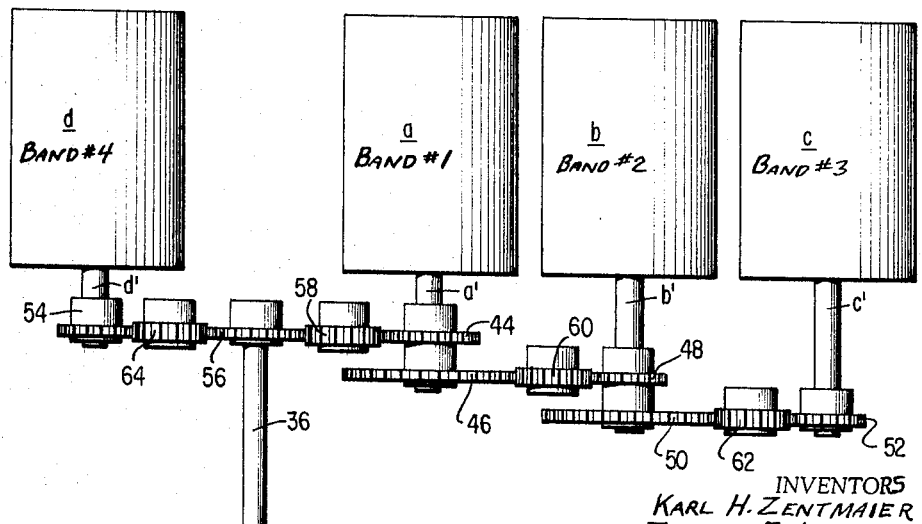
FIG. 5 is a schematic view of the indicator assembly.

With reference to FIG. 4, shaft 24 is driven by an input shaft 28 through bevel gears 32 and 34 fixed to shaft 28 and 24, respectively. Shaft 28 may be a range or band selector shaft connected to control a frequency band determining element of the receiver. Assuming that the receiver is operable on four bands, designated for convenience as bands 1, 2, 3 and 4, indicator $a$ will be displayed at slot S when the receiver is operating on band 1 due to the position of shaft 28. When shaft 28 is rotated to shift the receiver to bands 2, 3 or 4, indicators $b$, $c$ or $d$, respectively, will be shifted to slot S. Indicators $a$, $b$, $c$ and $d$ display readings corresponding to the frequency within bands 1, 2, 3 and 4, respectively, in a manner described hereinafter.

As shown in FIG. 2, indicator $a$ (which is typical of the indicators) consists of number wheels $a1$, $a2$, and $a3$, representing units, tens and hundreds, respectively. Number wheels $a1$, $a2$ and $a3$ are interconnected through conventional transfer gears 66 and 68 in such a manner that number wheel $a2$ turns one revolution while number wheel $a1$ completes 10 revolutions, and number wheel $a3$ in turn completes one revolution for ten revolutions of number wheel $a2$.

Each of the digital indicators is operated simultaneously by an input shaft 36 rotatably journalled in a bearing or support member 22 which also may be secured to panel P (FIGS. 1 and 2). Shaft 36 may be driven by receiver tuning shaft 38 connected to control a tuning capacitor or the like for selecting frequency. Rotation of tuning shaft 38 is transmitted to input shaft 36 by means of a gear 40 fixed to the end of shaft 36 which in turn is meshed with a worm gear 42 mounted on tuning shaft 38. Operating shafts $a'$, $b'$, $c'$ and $d'$ project through plate 14 and are rotatable relative to the drum. Pairs of axially spaced gear wheels 44, 46 and 48, 50 are mounted on the outer ends of shafts $a'$ and $b'$, respectively, and single gear wheels 52 and 54 are mounted on the outer ends, respectively, of shafts $c'$ and $d'$. Mounted on the end of shaft 36 opposite gear wheel 40 is a gear wheel 56 and idler gear wheels 58, 60, 62 and 64 are mounted for free rotation on plate 14 to complete a transmission or drive train between shafts $a'$, $b'$, $c'$ and $d'$ and shaft 36. Thus, rotation of gear wheel 56 is transmitted to shaft $a'$ through idler gear 58 and gear wheel 44, which in turn transmits rotation to shaft $b'$ through gear wheels 46, 60 and 48. Shaft $b'$ in turn drives shaft $c'$ through gear wheels 50, 62 and 52; and shaft $d'$ is driven by input shaft 36 through gears 56, 64 and 54.

In FIG. 1, band selector shaft 28 is in the position connecting the receiver to operate on frequency band 1, with indicator $a$ displayed at slot S. Rotation of tuning shaft 38 changes the frequency within band 1, and such rotation is transmitted through input shaft 36 to turn the right number wheel $a1$ with number wheels $a2$ and $a3$ responding progressively in the order pointed out above. The frequency determined by shaft 38 is therefore displayed at slot S by the number wheels of indicator $a$.

Since the indicator shafts and input shaft 36 are geared together, a predetermined reading for each angular setting of shaft 38 will be displayed by each counter when it is shifted to its active position at slot S, with each indicator displaying a different order of numbers. By presetting the number wheels of the indicators relative to shafts 36 and 38, the proper frequency will automatically be displayed at slot S when drum 10 is rotated by input shaft 28 to shift from one band to another. For example, in FIGS. 1 and 2, the frequency for band 1 as shown by indicator $a$ is 098.5 megacycles. In a commercial embodiment of the invention, the number wheels of the indicators are preset so that with a reading of 098.5 shown at slot S by indicator $a$ for band 1, indicator $b$ will display a reading of 234; indicator $c$ will display a reading of 557; and indicator $d$ will display a reading of 1,328 when band selector shaft 28 shifts the receiver to bands 2, 3 and 4, respectively. In the same embodiment, the gearing between input shafts 36 and indicators $a$, $b$, $c$ and $d$ is such that for each revolution of shaft 36, the right number wheel of indicator $a$ will rotate one revolution, and the right number wheels of indicators $b$, $c$ and $d$, respectively, will rotate 69/29, (69/29)2 and 39/29 revolutions. As viewed from the right end of FIGS. 2 and 4, clockwise rotation of shaft 36 causes clockwise rotation of shafts $a'$, $b'$, $c'$ and $d'$.

In order to maintain the proper setting of the indicators as drum 10 rotates, shaft 36 must be held stationary. In the illustrated embodiment (FIG. 4) worm gear 42 prevents shaft 36 from rotating except in response to rotation of shaft 38. Consequently, with indicator $a$ in the active position at slot S, and displaying a reading of 098.5, clockwise rotation of drum 10 as viewed from the right in FIGS. 2 and 4, will shift indicator $a$ away from slot S and indicator $b$ will move into the active position adjacent slot S with a reading of 234. Since shaft 36 is held stationary by worm gear 42 during rotation of drum 10, gear wheel 56 will turn 90 degrees relative to drum 10 during rotation of drum 10 to position indicator $b$ at slot S. Thus, the number wheels of indicator $b$ are preset such that the 90 degree rotation to remove indicator $a$ from the active position and to move indicator $b$ into the active position will cause the proper reading to be displayed automatically by indicator $b$. Further rotation of drum 10 to position indicator $c$ for band 3 at slot S will cause the number wheels of indicator $c$ to read 557 automatically at viewing slot S. Similarly, indicator $d$ will read 1,328 at slot S when drum 10 is rotated 270° from the position shown in FIGS. 2 and 4.

Therefore, for each angular position or setting of shaft 38, there is a predetermined reading for each of the indicators when it assumes the active position at slot S. Since all of the indicators are interconnected with a common input shaft 36, the indicators are maintained in proper orientation with respect to each other and with respect to shaft 36. The invention, although particularly useful with multi-range radio equipment, is not limited to the latter type of apparatus, but may be employed in other apparatus having plural ranges of adjustment.

While a specific example of the invention has been illustrated and described, it should be understood that the invention is not limited to the precise construction and environment described, and that various alterations and modifications in the construction and arrangement of parts can be made by those skilled in the art without departing from the scope and spirit of the invention.

What is claimed is:
1. A multi-range radio frequency indicating mechanism comprising:
   a panel having a viewing slot formed therein,
   a drum rotatably mounted adjacent said panel with its axis of rotation parallel to the longitudinal axis of said viewing slot,
   a plurality of digital frequency indicators mounted on said drum with their longitudinal axes in spaced, parallel relationship to the axis of said drum,
      each of said digital frequency indicators comprising a plurality of number wheels and an operating shaft rotatable independently of said drum for rotating the number wheels thereof progressively in the order of ten to one,
   an input shaft,
   gear means connecting the operating shafts of said plurality of digital frequency indicators to said input shaft for simultaneously actuating all of said digital indicators,
      said gear means connecting said input shaft and the operating shafts of said digital indicators having different gear ratios, respectively, corresponding to the frequency steps of each associated frequency band, respectively,
      said gear means comprising a first gear train between at least one of said operating shafts and said input shaft and a second gear train between said input shafts and the remaining operating shafts connecting said operating shafts in succession, from the lowest frequency band to the highest frequency band of digital indicators associated with said operating shafts,
   band selector means for rotating said drum relative to said panel to position a selected one of said digital indicators adjacent said viewing slot,
   means for preventing rotation of said input shaft relative to said panel because of said rotation of said drum so that on turning of said drum a fraction of a revolution said gear means adjusts the selected digital indicator next positioned adjacent said viewing slot as it is being moved to said viewing slot so that said next positioned digital indicator displays the exact frequency setting of said input shaft.
2. The multi-range radio frequency indicating mecha- nism defined in claim 1 wherein the gear ratios of said second gear train drives a first number wheel operating shaft at a ratio of 1:1 and the second and succeeding number wheel operating shafts at higher rates less than a whole number multiple thereof.

References Cited by the Examiner

UNITED STATES PATENTS

| | | | |
|---|---|---|---|
| 1,195,862 | 8/1916 | Smithey | 235—91 |
| 1,523,796 | 1/1925 | Willis | 235—110 X |
| 2,275,506 | 3/1942 | Crowley | 74—10.8 |
| 2,746,419 | 5/1956 | Serge | 116—124.1 |
| 2,914,953 | 12/1959 | Tyzack | 74—10.52 |

RICHARD B. WILKINSON, *Primary Examiner.*

LEO SMILOW, LOUIS J. CAPOZI, *Examiners.*

C. G. COVELL, JAMES G. MURRAY,
*Assistant Examiners.*